US012704453B2

(12) United States Patent
Smith et al.

(10) Patent No.: US 12,704,453 B2
(45) Date of Patent: Aug. 11, 2026

(54) PHOTOACOUSTIC CUVETTE PLATFORM

(71) Applicants: Barbara Smith, Tempe, AZ (US); Ethan Marschall, Queen Creek, AZ (US); Christopher Miranda, Mesa, AZ (US)

(72) Inventors: Barbara Smith, Tempe, AZ (US); Ethan Marschall, Queen Creek, AZ (US); Christopher Miranda, Mesa, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 93 days.

(21) Appl. No.: 18/626,733

(22) Filed: Apr. 4, 2024

(65) Prior Publication Data

US 2024/0337585 A1 Oct. 10, 2024

Related U.S. Application Data

(60) Provisional application No. 63/494,527, filed on Apr. 6, 2023.

(51) Int. Cl.
*G01N 21/03* (2006.01)
*G01N 21/17* (2006.01)

(52) U.S. Cl.
CPC ......... *G01N 21/03* (2013.01); *G01N 21/1702* (2013.01); *G01N 2201/021* (2013.01)

(58) Field of Classification Search
CPC ............... G01N 21/03; G01N 21/1702; G01N 2201/021; G01N 29/2418; G01N 21/05; G01N 29/0681; G01N 15/1434; G01N 21/01; G01N 29/0672; A61B 5/0095; B01L 2300/0877; B01L 3/502784; B01L 2300/0829; B01L 3/5453; B01L 9/06
See application file for complete search history.

(56) References Cited

U.S. PATENT DOCUMENTS 3,695,772 A * 10/1972 Spyropoulos .......... G01N 21/03 356/246
4,040,234 A * 8/1977 Stockdale ................. B01L 9/06 53/421
4,208,127 A * 6/1980 Hufenreuter .............. B01L 9/06 356/244
4,863,693 A * 9/1989 Howell .................. G01N 21/03 422/65

(Continued)

OTHER PUBLICATIONS

-Thorlabs Objective LMH—10X-532 Specs; downladble from https://www.thorlabs.com/thorproduct.cfm?partnumber=LMH-10X-532.*

*Primary Examiner* — Mohamed K Amara
(74) *Attorney, Agent, or Firm* — Riverside Law LLP

(57) ABSTRACT

Aspects of the present invention relate to a cuvette platform including a body having a base and at least one cuvette mounting surface positioned above and parallel to the base and comprising at least one of side retainers and corner retainers configured to retain a cuvette, at least one peripheral mounting surface extending upward from a first edge of the base forming a right angle with the base and configured to receive at least one peripheral, at least one flange extending outward from a second edge of the base forming a right angle with the base and comprising at least one mounting feature.

20 Claims, 9 Drawing Sheets

(56) References Cited

U.S. PATENT DOCUMENTS 5,540,890 A * 7/1996 Clark ...................... H01J 49/04
422/570
6,016,193 A * 1/2000 Freeman ................ G01N 21/03
356/244
6,108,096 A * 8/2000 Ushio ................ G01N 21/1702
356/440
8,493,559 B2 * 7/2013 Harvard ................ B01L 3/5021
356/440
8,908,179 B2 * 12/2014 Ostermeyer ........... G01N 21/51
422/500
9,279,761 B1 * 3/2016 Sternick ................. G01N 21/03
11,112,418 B1 * 9/2021 Holmes .............. G01N 15/1434
12,564,837 B2 * 3/2026 Krueger ............ B01L 3/502761
2001/0050339 A1 * 12/2001 Panigrahi ............... G01N 21/31
250/341.2
2011/0141466 A1 * 6/2011 Magnusson ....... B01L 3/502715
356/319
2017/0315057 A1 * 11/2017 Kovriguine .......... G01N 33/487
2018/0317777 A1 * 11/2018 Xia ...................... H04R 23/008
2020/0122148 A1 * 4/2020 Cunningham ............ B01L 9/06
2020/0271655 A1 * 8/2020 Smith .................... G02B 21/16
2020/0340954 A1 * 10/2020 Smith .................. A61B 5/0095
2025/0134388 A1 * 5/2025 Li ........................ A61B 5/0095

* cited by examiner

PHOTOACOUSTIC CUVETTE PLATFORM

CROSS-REFERENCE TO RELATED APPLICATIONS

This application claims priority to U.S. Provisional Application No. 63/494,527, filed on Apr. 6, 2023, incorporated herein by reference in its entirety.

BACKGROUND OF THE INVENTION

Cuvettes are small containers, typically made of glass or plastic, and are used to measure the absorbance of light in spectroscopy. They are designed to hold a small volume of liquid sample and are optically transparent, allowing light to pass through the sample. Cuvettes may be used in a wide range of applications, such as spectrophotometry, fluorescence spectroscopy, ultraviolet-visible spectroscopy, and photoacoustic spectroscopy.

The optical characteristics of the cuvette, such as its geometry, transparency, and surface finish, all influence the accuracy of the measurement. Additionally, providing a suitable stage or platform for the cuvette influences the quality of inputs and outputs and reliability of measurements. Novel cuvette platforms that offer improved capabilities are needed to host a wide range of spectroscopy applications.

Thus, there is a need in the art to develop a novel cuvette platform for use in various forms of spectroscopy. The present invention meets this need.

SUMMARY OF THE INVENTION

Aspects of the present invention relate to a cuvette platform including a body having a base and at least one cuvette mounting surface positioned above and parallel to the base and having at least one of side retainers and corner retainers configured to retain a cuvette, at least one peripheral mounting surface extending upward from a first edge of the base forming a right angle with the base and configured to receive at least one peripheral, at least one flange extending outward from a second edge of the base forming a right angle with the base and having at least one mounting feature, wherein the cuvette platform has a width ranging between about 10 mm and about 100 mm, a length ranging between about 50 mm and about 150 mm, and a height ranging between about 50 mm and about 150 mm, and wherein the cuvette mounting surface has an area ranging between about 120 $mm^2$ and about 220 $mm^2$.

In some embodiments, the at least one mounting feature comprises at least one of a hole, a tab, a slot, a pin, and a clip. In some embodiments, the at least one mounting feature comprises a hole passing through the flange configured to receive a bolt. In some embodiments, the bolt is an M6 bolt and the cuvette platform is fixedly attached to a threaded hole with the bolt.

In some embodiments, the cuvette platform further includes at least one mounting post extending outward from the body perpendicular to the at least one cuvette mounting surface. In some embodiments, the at least one mounting post comprises the at least one peripheral mounting surface. In some embodiments, the peripheral mounting surface is configured to mount at least one of a transducer, an objective, and a light source. In some embodiments, the transducer has a diameter ranging between about 1 mm and about 15 mm, and the objective has a diameter ranging between about 1 mm and about 15 mm.

In some embodiments, the peripheral mounting surface is formed by a semi-circle cutout region in the mounting post, and is configured to mount a 6 mm transducer. In some embodiments, the side retainers and corner retainers comprise at least one of a ridge, an edge, a rib, a detent, a clip.

In some embodiments, the cuvette platform is formed of at least one of Polylactic Acid (PLA), Polytetrafluoroethylene (PTFE), Polyethylene Terephthalate Glycol (PETG), Polyethylene Terephthalate (PET), Polypropylene (PP), Polyether Ether Ketone (PEEK), Acrylonitrile Butadiene Styrene (ABS), aluminum, stainless steel, and titanium. In some embodiments, the cuvette platform has a width of about 43 mm, a length of about 100 mm, and a height of about 80 mm. In some embodiments, the cuvette platform has a width of 43 mm, a length of 100 mm, and a height of 80 mm.

Aspects of the present invention relate to a system including a cuvette platform including a body having a base and at least one cuvette mounting surface positioned above and parallel to the base and having at least one of side retainers and corner retainers configured to retain a cuvette, at least one peripheral mounting surface extending upward from a first edge of the base and forming a right angle with the base and configured to receive at least one peripheral, at least one flange extending outward from a second edge of the base and forming a right angle with the base and having at least one mounting feature, wherein the cuvette platform has a width ranging between about 10 mm and about 100 mm, a length ranging between about 50 mm and about 150 mm, and a height ranging between about 50 mm and about 150 mm, and wherein the cuvette mounting surface has an area ranging between about 120 $mm^2$ and about 220 $mm^2$, a cuvette positioned on the cuvette mounting surface, at least one transducer positioned on the peripheral mounting surface, an objective with light source directed towards the cuvette.

In some embodiments, the transducer is configured to read at least one signal from a cuvette mounted on the cuvette mounting surface. In some embodiments, the objective is configured to provide light to the cuvette. In some embodiments, the transducer is configured to capture at least one signal from the cuvette. In some embodiments, the transducer is configured to generate acoustic waves. In some embodiments, the at least one transducer comprises a first transducer directed towards the cuvette configured to capture at least one signal from the cuvette, and a second transducer directed towards the cuvette configured to generate acoustic waves.

Aspects of the present invention relate to a system including a cuvette platform including a body having a base and at least one cuvette mounting surface positioned above and parallel to the base and having at least one of side retainers and corner retainers configured to retain a cuvette, at least one peripheral mounting surface extending upward from a first edge of the base and forming a right angle with the base and configured to receive at least one peripheral, at least one flange extending outward from a second edge of the base and forming a right angle with the base and having at least one mounting feature; wherein the cuvette platform has a width ranging between about 10 mm and about 100 mm, a length ranging between about 50 mm and about 150 mm, and a height ranging between about 50 mm and about 150 mm, and wherein the cuvette mounting surface has an area ranging between about 120 $mm^2$ and about 220 $mm^2$, a computing device communicatively connected to a transducer, a light source, and an objective, having a processor and a non-transitory computer-readable medium with instructions stored thereon, which when executed by a processor, performs the steps including illuminating a cuvette with the objective, and capturing signals from the cuvette with the transducer.

Aspects of the present invention relate to a photoacoustic measurement method having the steps of providing a cuvette platform including a body having a base and at least one cuvette mounting surface positioned above and parallel to the base and having at least one of side retainers and corner retainers configured to retain a cuvette, at least one peripheral mounting surface extending upward from a first edge of the base and forming a right angle with the base and configured to receive at least one peripheral, at least one flange extending outward from a second edge of the base and forming a right angle with the base and having at least one mounting feature; wherein the cuvette platform has a width ranging between about 10 mm and about 100 mm, a length ranging between about 50 mm and about 150 mm, and a height ranging between about 50 mm and about 150 mm, and wherein the cuvette mounting surface has an area ranging between about 120 $mm^2$ and about 220 $mm^2$; affixing the cuvette platform to a surface, mounting a cuvette on the cuvette platform, positioning an objective to illuminate the cuvette, and mounting a transducer on the peripheral mounting surface configured to read a signal from the cuvette.

Aspects of the present invention relate to a photoacoustic measurement method, having the steps of providing a cuvette platform including a body having a base and at least one cuvette mounting surface positioned above and parallel to the base and having at least one of side retainers and corner retainers configured to retain a cuvette, at least one peripheral mounting surface extending upward from a first edge of the base and forming a right angle with the base and configured to receive at least one peripheral, at least one flange extending outward from a second edge of the base and forming a right angle with the base and having at least one mounting feature; wherein the cuvette platform has a width ranging between about 10 mm and about 100 mm, a length ranging between about 50 mm and about 150 mm, and a height ranging between about 50 mm and about 150 mm, and wherein the cuvette mounting surface has an area ranging between about 120 $mm^2$ and about 220 $mm^2$; affixing the cuvette platform to a surface, mounting a cuvette on the cuvette mounting surface, illuminating the cuvette with an objective, and capturing signals from the cuvette with a transducer.

BRIEF DESCRIPTION OF THE DRAWINGS

The following detailed description of embodiments of the invention will be better understood when read in conjunction with the appended drawings. It should be understood, however, that the invention is not limited to the precise arrangements and instrumentalities of the embodiments shown in the drawings.

DETAILED DESCRIPTION

It is to be understood that the figures and descriptions of the present invention have been simplified to illustrate elements that are relevant for a clear understanding of the present invention, while eliminating, for the purpose of clarity many other elements found in related systems and methods. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Definitions

Unless defined otherwise, all technical and scientific terms used herein have the same meaning as commonly understood by one of ordinary skill in the art to which the invention pertains. Although any methods and materials similar or equivalent to those described herein can be used in the practice for testing of the present invention, exemplary materials and methods are described herein. In describing and claiming the present invention, the following terminology will be used.

It is also to be understood that the terminology used herein is for the purpose of describing particular embodiments only, and is not intended to be limiting.

The articles “a” and “an” are used herein to refer to one or to more than one (i.e., to at least one) of the grammatical object of the article. By way of example, “an element” means one element or more than one element.

“About” as used herein when referring to a measurable value such as an amount, a temporal duration, and the like, is meant to encompass the specified value or variations of ±20%, ±10%, ±5%, ±1%, or ±0.1% from the specified value, as such variations are appropriate.

Ranges: throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Photoacoustic Cuvette Platform

Figure 1A:
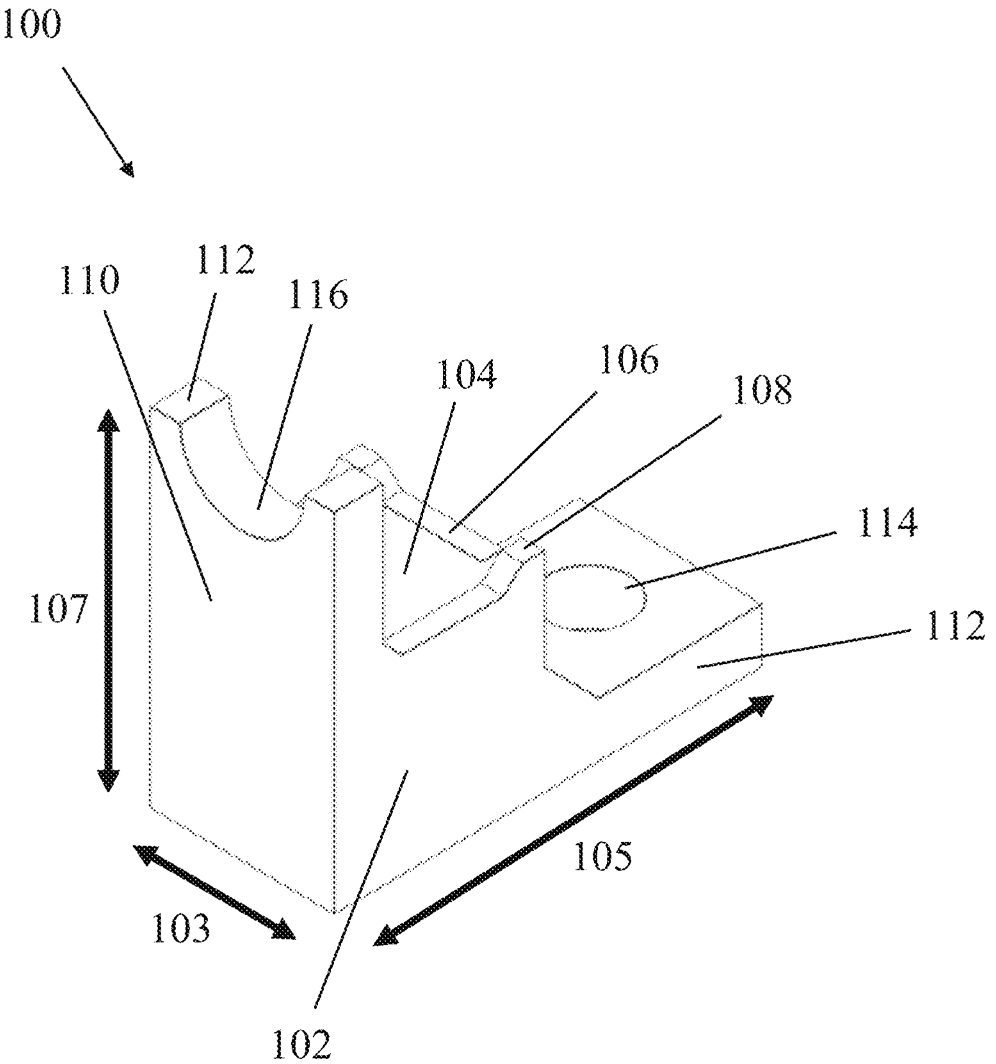
FIG. 1A depicts a perspective view of an exemplary cuvette platform according to aspects of the present invention.

As contemplated herein, a cuvette platform is now described. Referring now to FIG. 1A, shown is a perspective view of an exemplary cuvette platform 100. In some embodiments, cuvette platform 100 comprises a body 102 having at least one cuvette mounting surface 104, whereon one cuvette is held in place on cuvette mounting surface 104 using any combination of side retainers 106 and/or corner retainers 108. Side retainers 106 and/or corner retainers 108 may comprise any of a ridge, an edge, a rib, a detent, a clip. In some embodiments, cuvette platform 100 further comprises at least one mounting post 110 extending perpendicularly from the at least one cuvette mounting surface 104 and comprising at least one peripheral mounting surface 112. In some embodiments, cuvette platform 100 further comprises at least one flange 112 extending outward laterally from body 102 and comprising at least one mounting feature 114 for affixing cuvette platform 100 to surfaces, equipment, machines and the like.

Cuvette mounting surface 104, side retainers 106 and/or corner retainers 108 are appropriately sized for receiving and holding stationary any cuvette as would be known by one of ordinary level of skill in the art. This includes, but is not limited to, standard square spectrometry cuvettes that have a height of 45 mm×a length of 12.5 mm×and a width of 12.5 mm. In some embodiments, cuvette mounting surface 104 is configured for a standard cuvettes having an approximate volume of 3.5 mL, semi-micro cuvettes having a volume between 0.35-3.5 mL, sub-micro cuvettes having a volume between 20 μL-350 μL and macro cuvettes holding a volume greater than 3.5 mL (commonly 7-35 mL). Additionally, cuvette mounting surface 104 may be sized and shaped to receive round cuvettes ranging in diameter between 1 mm to 25 mm. In some embodiments, cuvette mounting surface 104 has an area ranging between 120 $mm^2$ and 220 $mm^2$. In some embodiments, cuvette mounting surface 104 has an area of about 156 $mm^2$. It should be appreciated that the disclosed cuvette platform may fixedly and releasably hold or retain and cuvette known in the art. For example, in some embodiments the cuvettes comprise glass, quartz, optical glass, UV quartz, and/or IR quartz. In some embodiments, the cuvettes are any one of a square tube, round tube, beveled edge, rounded edge, frosted glass and/or have a plastic lid.

Mounting post 110 and peripheral mounting surface 112 are configured to mount, receive, position, rest, and/or affix peripherals including but not limited to: a transducer, an objective, a laser diode, an optic, a light source, an electromagnet, any sensor 265 of computing device 200 of the present invention, and other peripherals for spectroscopy as would be known by one of ordinary level of skill in the art. In some embodiments, mounting post 110 and peripheral mounting surface 112 comprise a cutout region 116 that is configured to affix, align and/or stabilize a peripheral. In some embodiments, cutout region 116 is a cutout region with no material in at least a portion of mounting post 110 and peripheral mounting surface 112. In some embodiments, cutout region 116 may have any shape, including, but not limited to, a semi-circle, a semi-ellipse, a circle, an ellipse, a square, a rectangle, a grid of holes. In some embodiments, cutout region 116 is a semicircle and has a radius ranging between 1 mm and 10 mm. In some embodiments, the cutout region 116 is configured to affix, align and/or stabilize transducers having a diameter between 2 mm and 20 mm. In some embodiments, cutout region 116 is a semi-circle having a radius of 3 mm configured to align and stabilize a 6 mm transducer.

In some embodiments, cuvette platform 100 utilizes side retainers 106 and/or corner retainers 108 that are short relative to the height of the cuvette. In some embodiments, platform 100 may be configured to align various sizes of transducers and objectives. This includes, but is not limited to, transducers and/or objectives ranging in size from about 1 mm to about 25 mm.

In some embodiments, the at least one mounting feature 114 comprises a hole passing through flange 112 configured and sized for accepting and/or receiving any bolt or screw and affixing cuvette platform 100 to a surface and/or post. In some embodiments, the at least one mounting feature 114 comprises at least one of slots, tabs, retainers, clips, and the like, for affixing cuvette platform 100 to a reciprocal feature and/or surface. In some embodiments, mounting feature 114 comprises a hole configured to receive an M6-screw. In some embodiments, cuvette platform 100 is mounted onto a post with an M6-screw.

In some embodiments, cuvette platform 100 is formed of or comprises at least one of a plastic material, metal material, polymer material, and 3D printed material. In some embodiments, cuvette platform 100 is formed of or comprises at least one of titanium, stainless steel and aluminum. In some embodiments, cuvette platform comprises at least one of Polylactic Acid (PLA), Polyether Ether Ketone (PEEK), Acrylonitrile Butadiene Styrene (ABS), Polyethylene Terephthalate (PET), Polyvinyl Alcohol (PVA), Polytetrafluoroethylene (PTFE), Polyethylene Terephthalate Glycol (PETG), polycarbonate (PC), polypropylene (PP), polyethylene (PE), polyamide (PA), and polyvinyl chloride (PVC).

Figure 1B:
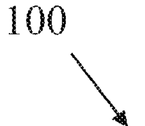
FIG. 1B depicts a side view of the cuvette platform of FIG. 1A.
Figure 1B:
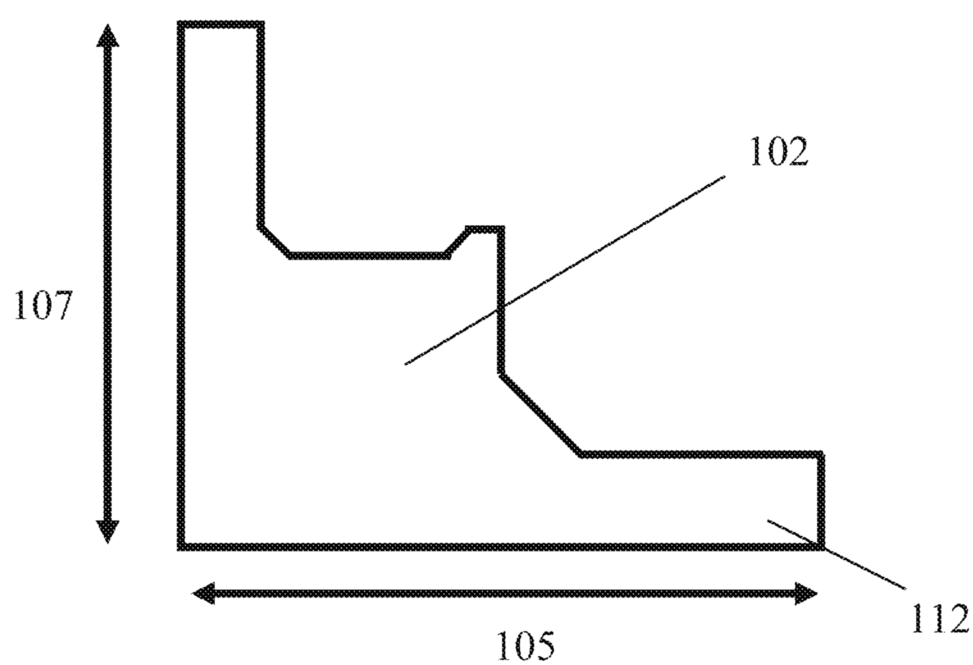
Figure 1C:
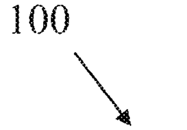
FIG. 1C depicts a front view of the cuvette platform of FIG. 1A.
Figure 1C:
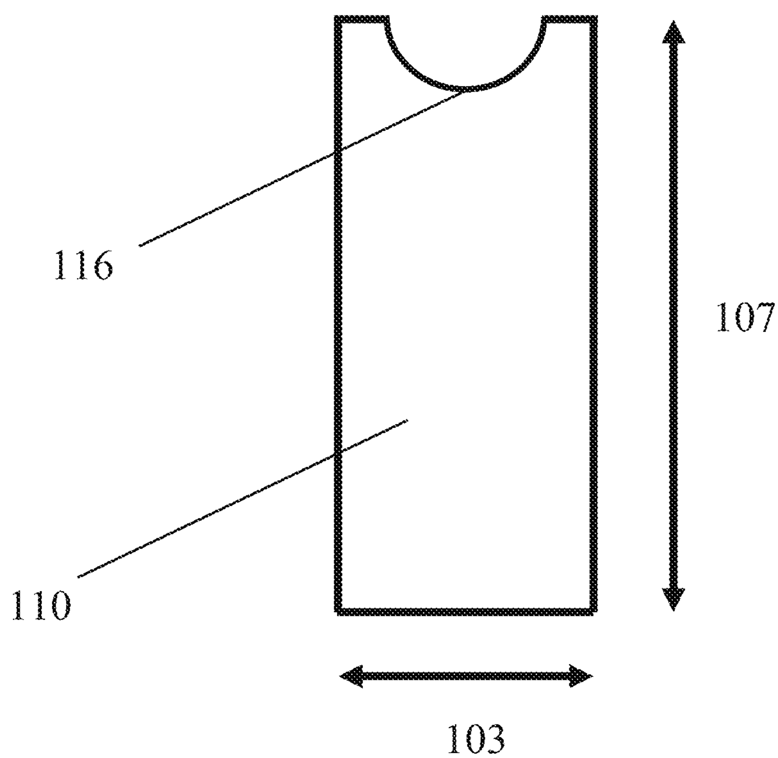
Figure 1D:
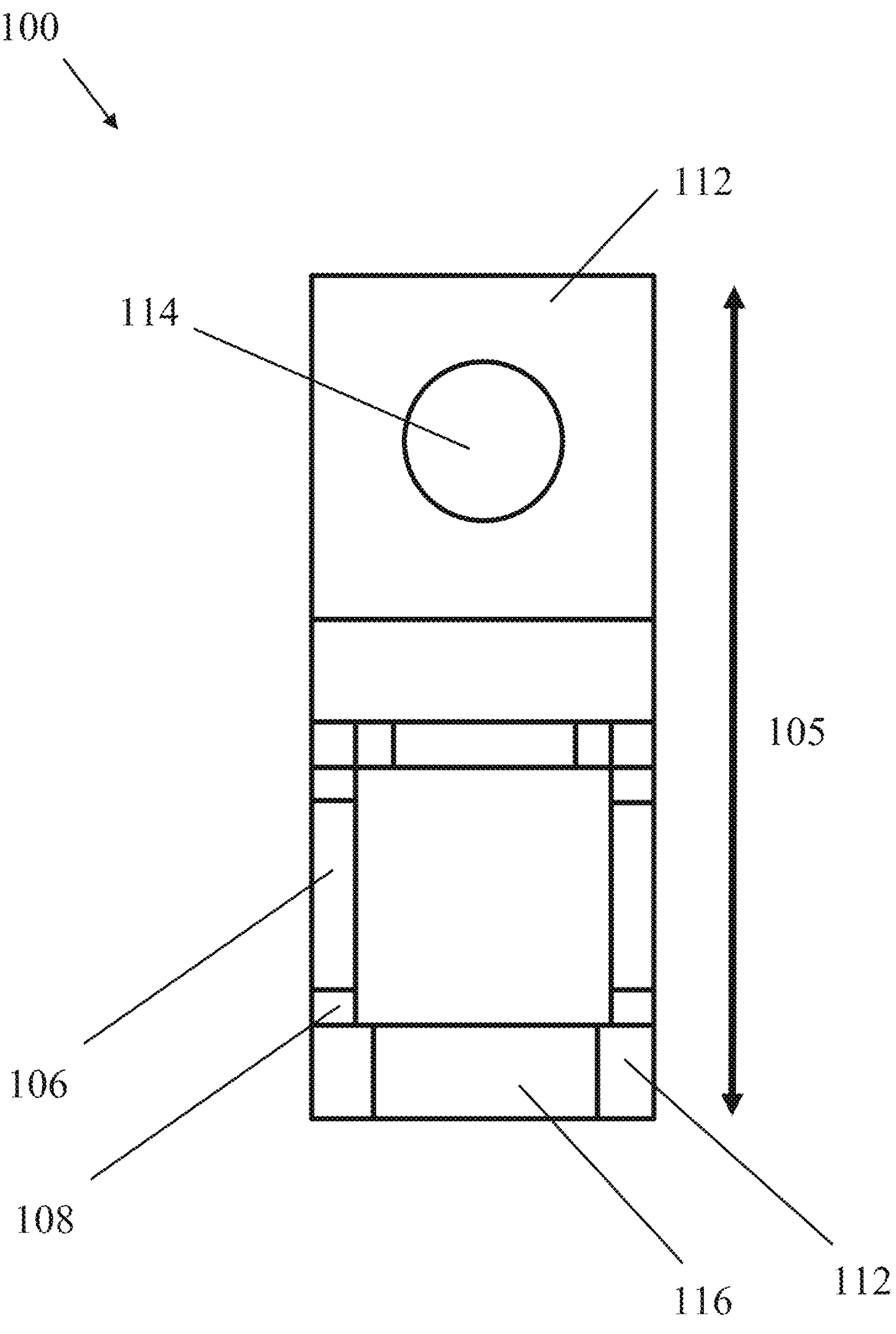
FIG. 1D depicts a top-down view of the cuvette platform of FIG. 1A.

Aspects of the present invention relate to dimensions for a cuvette platform. Referring now to FIGS. 1B, 1C and 1D, shown is an exemplary cuvette platform 100 of the present invention, including various views and measurements/dimensions. In some embodiments, cuvette platform 100 has a width 103 ranging between about 5 mm and about 100 mm, a length 105 ranging between about 5 mm and about 50 mm, and a height 107 ranging between about 5 mm and about 100 mm. In some embodiments, cuvette platform has a width 1.69 cm, a length of 3.94 cm, and height of 3.2 cm. In some embodiments, the cuvette platform has a width of 43 mm, a length of 100 mm, and a height of 80 mm.

Aspects of the present invention relate to methods of use for a cuvette platform. In some embodiments, cuvette platform 100 is configured and/or used for any spectroscopy as would be known by one of ordinary level of skill in the art. In some embodiments, cuvette platform 100 is configured and/or used for acoustic and/or optical detection. In some embodiments, cuvette platform 100 is configured and/or used for photoacoustic detection. In some embodiments, cuvette platform 100 is configured and/or used for schlieren optics. In some embodiments, cuvette platform 100 measures at least one signal from a sample in a cuvette. In some embodiments, the signal is at least one of an acoustic signal, mechanical wave, mechanical radiation, phonon, vibration, sound, ultrasound, and infrasound. In some embodiments, cuvette platform 100 produces at least one spectrum of a sample. In some embodiments, cuvette platform 100 is configured for photoacoustic detection of a sample in a cuvette. In some embodiments, cuvette platform 100 produces at least one photoacoustic spectrum of a sample. The preparation methods for the sample in the cuvette follow standard methods as would be known by one of ordinary level of skill in the art.

Figure 2A:
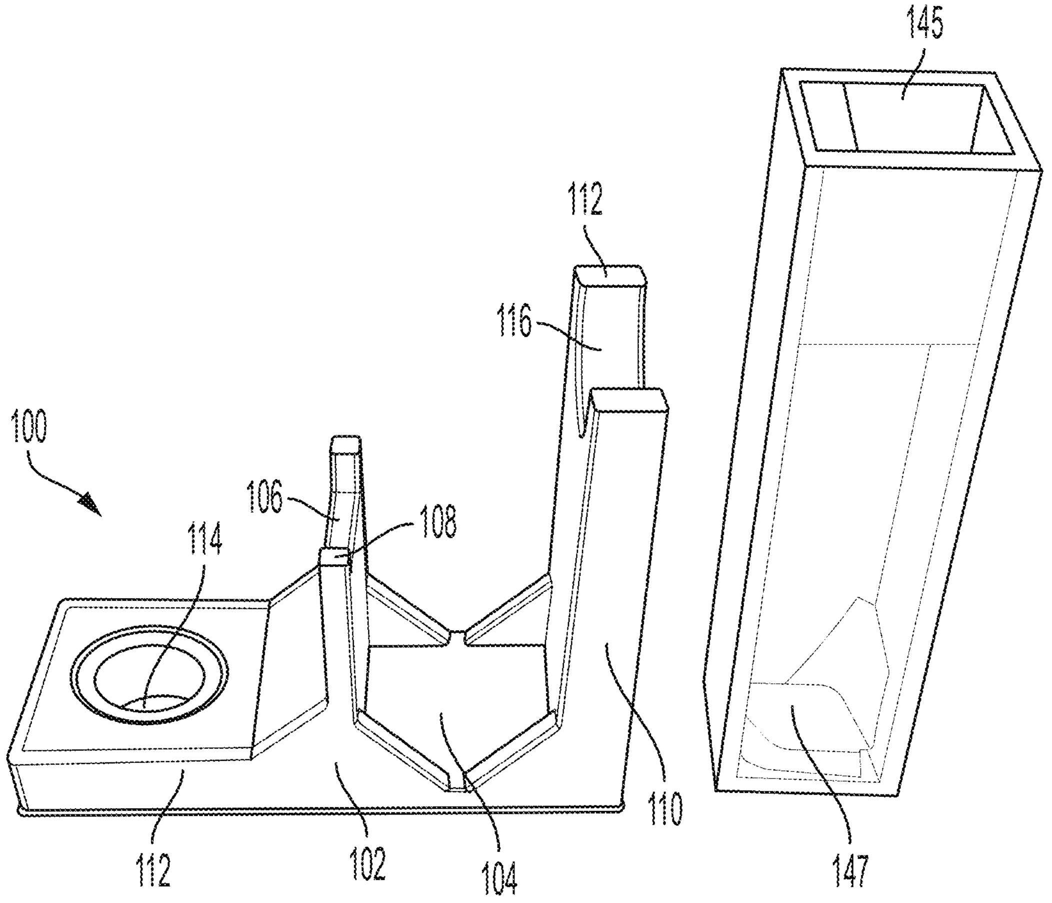
FIG. 2A depicts a side view of an exemplary cuvette platform with a cuvette adjacent to the platform.
Figure 2B:
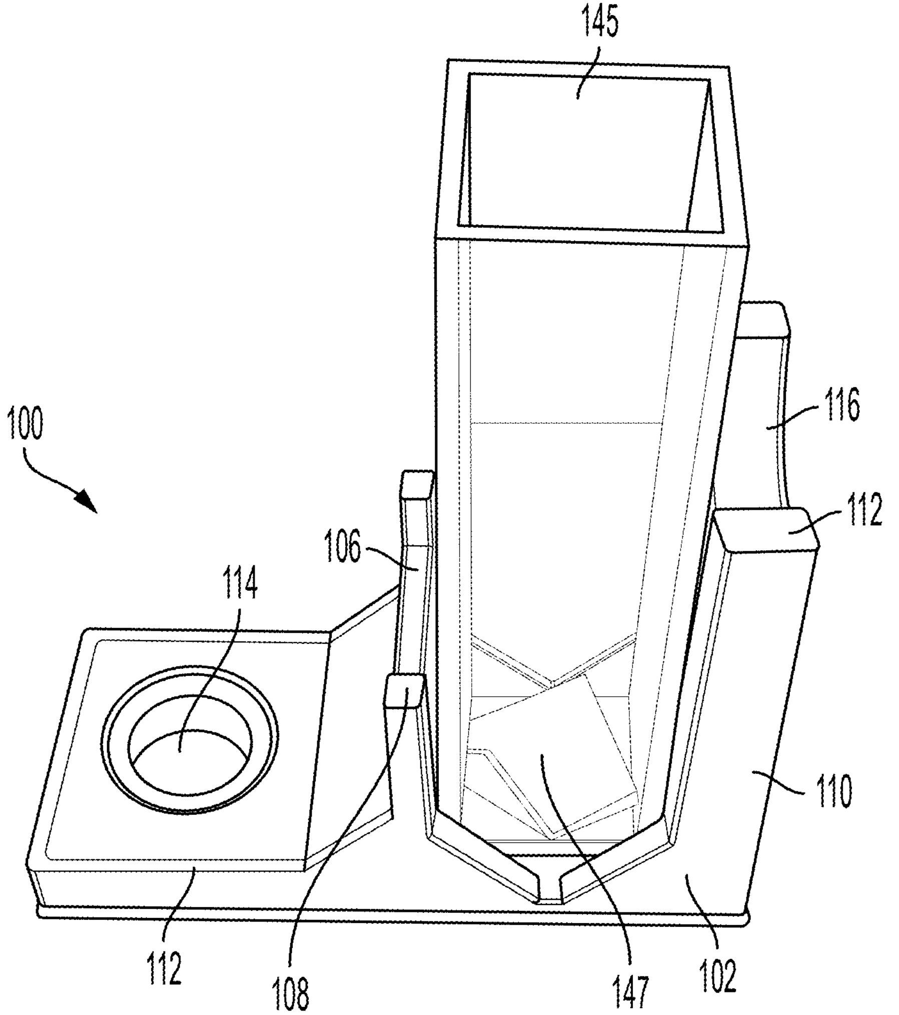
FIG. 2B depicts a side view of an exemplary cuvette platform with a cuvette mounted on the platform.
Figure 2C:
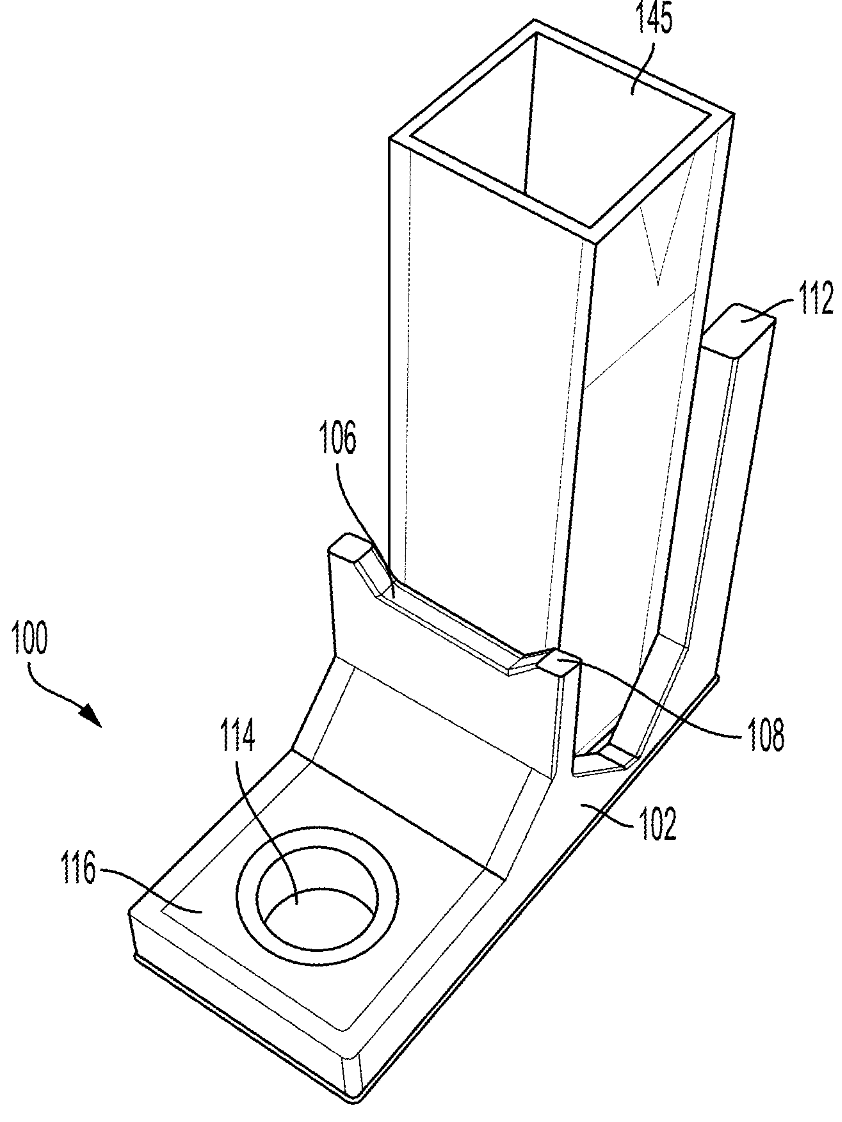
FIG. 2C depicts a perspective view of an exemplary cuvette platform with a cuvette mounted on the platform.

Referring now to FIGS. 2A, 2B and 2C, shown is an exemplary cuvette platform 100 configured to receive a cuvette 145 containing a sample 147. FIG. 2A shows an exemplary cuvette platform 100 with cuvette 145 adjacent to the platform with mounting surface 104 prepared to receive the cuvette. FIGS. 2B and 2C show cuvette 145 mounted onto mounting surface 104 (not shown), with cuvette 145 containing a sample 147.

Figure 3:
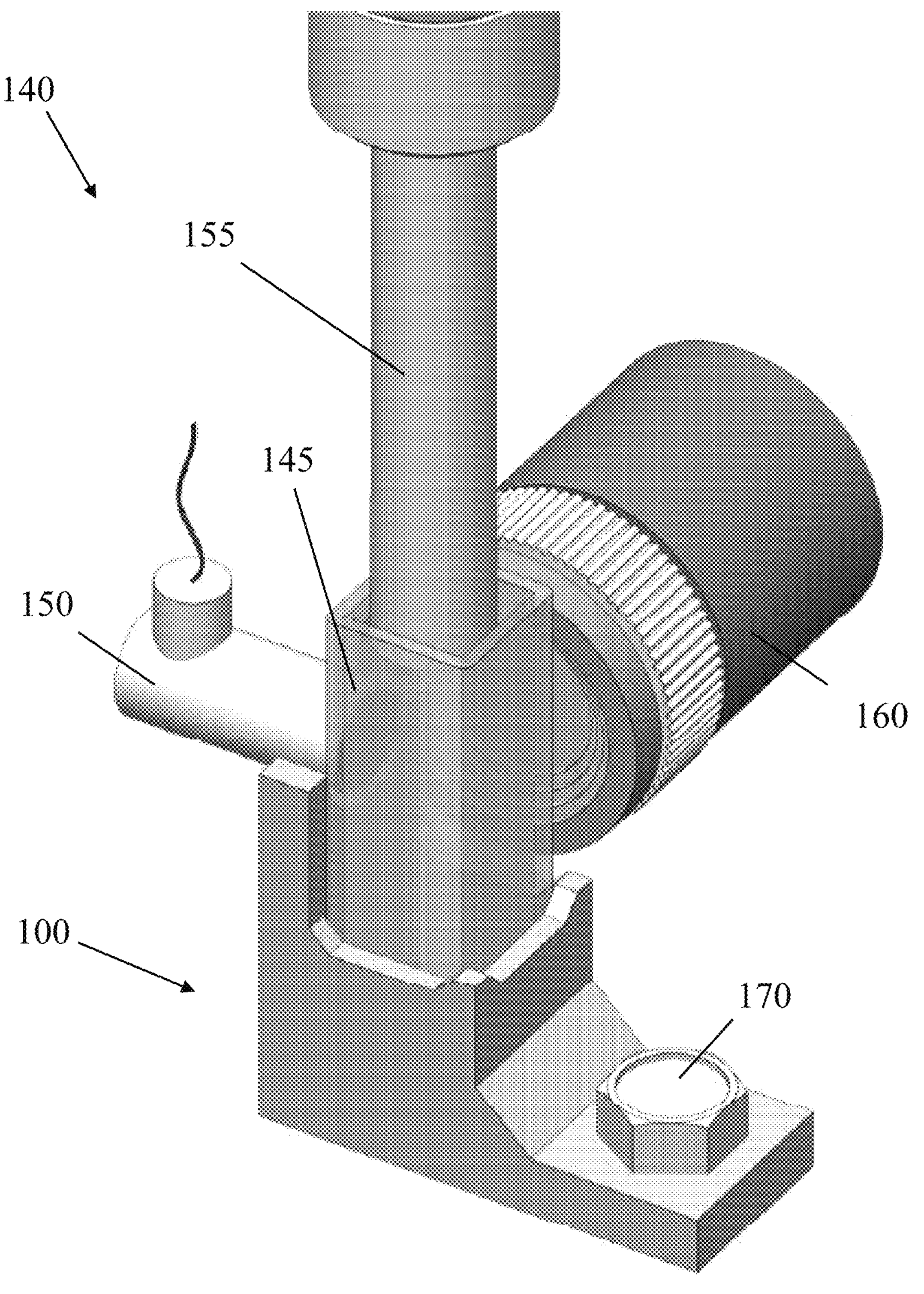
FIG. 3 depicts an exemplary system comprising the photoacoustic cuvette platform of FIG. 1A and a transducer and objective according to aspects of the present invention.

Referring now to FIG. 3, shown is an exemplary system comprising a cuvette platform 100 configured to receive a cuvette 145 positioned on cuvette mounting surface 104 (see FIGS. 1D and 1E), a transducer 150 positioned in cutout region 116 (see FIG. 3), a second transducer 155 positioned over and/or partially within cuvette 145, and an objective 160. As shown in this example, platform 100 is affixed to a surface (not shown) with mounting feature 114, and a bolt 170. In some embodiments, transducer 150 and/or transducer 155 are configured to generate acoustic waves. In some embodiments, transducer 150 and/or transducer 155 are configured to a receiving mode. In some embodiments, objective 160 configured to focus beams of light down to a point, wherein the focal point is inside cuvette 145. In some embodiments, objective 160 is threaded, achromatic and/or aspheric.

In one aspect, the present invention provides a system 140 comprising cuvette platform 100, as described herein and further comprising at least one of a transducer 150, a transducer 155, and/or an objective 160. In certain embodiments one or more of cuvette platform 100, transducer 150, light source 155, or objective 160 are communicatively connected to a computing device 200. In some embodiments, the objective is configured as a light source. In some embodiments, a light source may be alternatively used, wherein the light source may comprise a flat-cleaved fiber optic. In some embodiments, the light source provides a divergent beam profile. In some embodiments, the light is focused from an objective to make a narrow focal point and/or a tight spot size.

In some embodiments, system 140 comprises computing device 200 communicatively connected to one or more of platform 100, transducer 150, transducer 155, and objective 160, and comprising a processor and a non-transitory computer-readable medium with instructions stored thereon, which when executed by a processor, perform steps comprising, providing light to the cuvette with the objective, generating acoustic waves with a first transducer, and capturing signals (e.g. light, optical signals, sound, acoustic signals, photoacoustic signals) from the cuvette with a second transducer.

Aspects of the present invention relate to a photoacoustic measurement method, comprising the steps of providing any cuvette platform 100 of the present invention, affixing the cuvette platform to a surface, mounting a cuvette on the cuvette platform, positioning a light source and/or objective to illuminate the cuvette, mounting a transducer on the peripheral mounting surface, configured to read the cuvette, and positioning an objective to image the cuvette.

Aspects of the present invention relate to a photoacoustic measurement method, comprising the steps of providing any cuvette platform 100 of the present invention, affixing the cuvette platform to a surface, mounting a cuvette on the cuvette mounting surface, illuminating the cuvette with a light source and/or an objective, capturing signals from the cuvette with a transducer, and imaging the cuvette with an objective.

In some embodiments, any method of the present invention further comprises the step of generating a photoacoustic effect by the way of shining light from at least one objective onto a carbon thread. In some embodiments, the carbon thread may be taped to a circular glass slide, and the slide may be taped to the bottom of the cuvette. In some embodiments, the carbon thread is formed into, or positioned in the base of cuvette platform 100 (e.g., formed or positioned within cuvette mounting surface 104.

Computing Device

In some aspects of the present invention, software executing the instructions provided herein may be stored on a non-transitory computer-readable medium, wherein the software performs some or all of the steps of the present invention when executed on a processor.

Aspects of the invention relate to algorithms executed in computer software. Though certain embodiments may be described as written in particular programming languages, or executed on particular operating systems or computing platforms, it is understood that the system and method of the present invention is not limited to any particular computing language, platform, or combination thereof. Software executing the algorithms described herein may be written in any programming language known in the art, compiled, or interpreted, including but not limited to C, C++, C#, Objective-C, Java, JavaScript, MATLAB, Python, PHP, Perl, Ruby, or Visual Basic. It is further understood that elements of the present invention may be executed on any acceptable computing platform, including but not limited to a server, a cloud instance, a workstation, a thin client, a mobile device, an embedded microcontroller, a television, or any other suitable computing device known in the art.

Parts of this invention are described as software running on a computing device. Though software described herein may be disclosed as operating on one particular computing device (e.g. a dedicated server or a workstation), it is understood in the art that software is intrinsically portable and that most software running on a dedicated server may also be run, for the purposes of the present invention, on any of a wide range of devices including desktop or mobile devices, laptops, tablets, smartphones, watches, wearable electronics or other wireless digital/cellular phones, televisions, cloud instances, embedded microcontrollers, thin client devices, or any other suitable computing device known in the art.

Similarly, parts of this invention are described as communicating over a variety of wireless or wired computer networks. For the purposes of this invention, the words "network", "networked", and "networking" are understood to encompass wired Ethernet, fiber optic connections, wireless connections including any of the various 802.11 standards, cellular WAN infrastructures such as 3G, 4G/LTE, or 5G networks, Bluetooth®, Bluetooth® Low Energy (BLE) or Zigbee® communication links, or any other method by which one electronic device is capable of communicating with another. In some embodiments, elements of the networked portion of the invention may be implemented over a Virtual Private Network (VPN).

Figure 4:
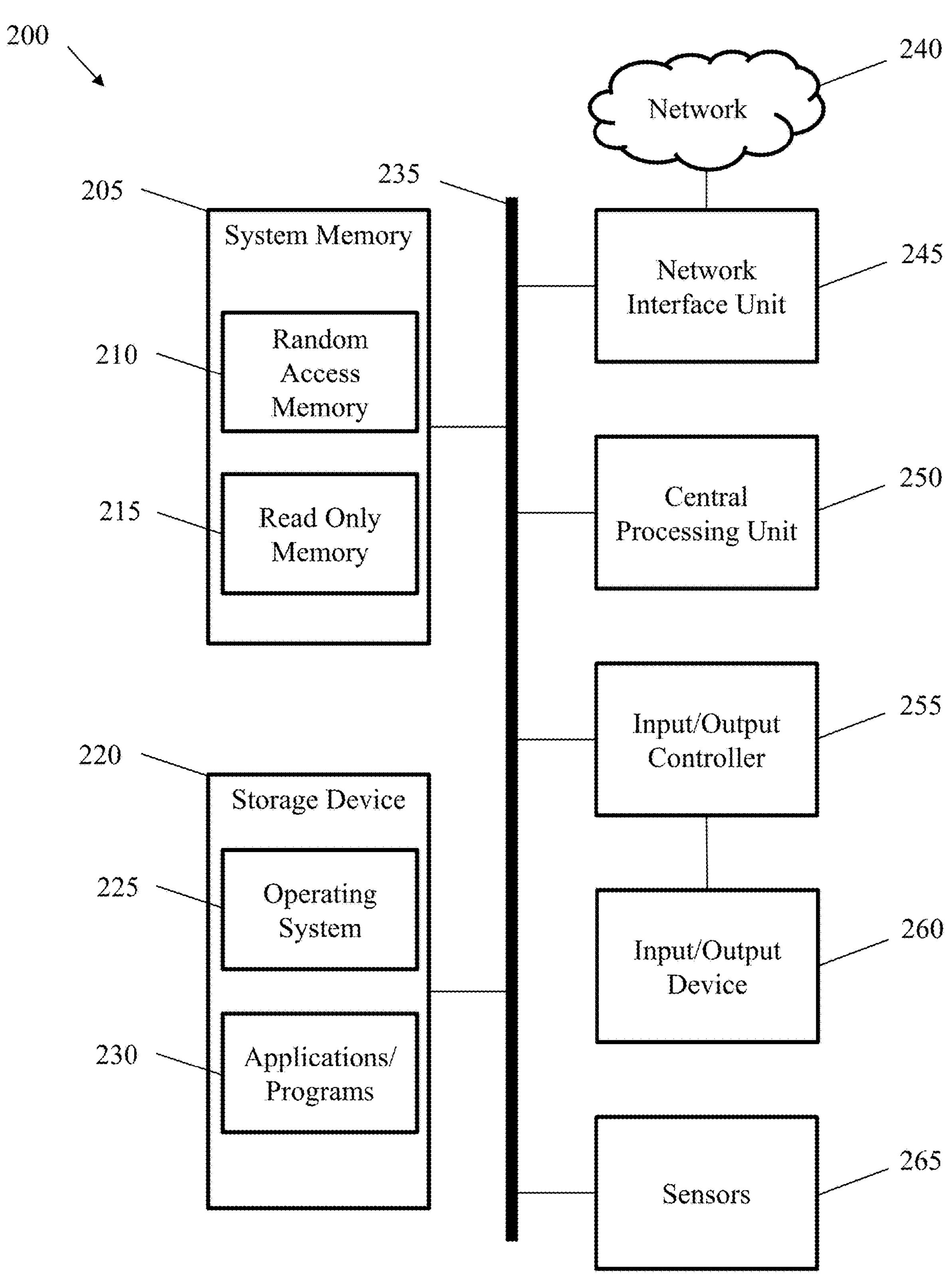
FIG. 4 depicts a computing device in which aspects of the present invention may be practiced in accordance with some embodiments.

FIG. 4 and the following discussion are intended to provide a brief, general description of a suitable computing environment in which the invention may be implemented. While the invention is described above in the general context of program modules that execute in conjunction with an application program that runs on an operating system on a computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 4 depicts an illustrative computer architecture for a computer 200 for practicing the various embodiments of the invention. The computer architecture shown in FIG. 4 illustrates a conventional personal computer, including a central processing unit 250 ("CPU"), a system memory 205, including a random access memory 210 ("RAM") and a read-only memory ("ROM") 215, and a system bus 235 that couples the system memory 205 to the CPU 250. A basic input/output system containing the basic routines that help to transfer information between elements within the computer, such as during startup, is stored in the ROM 215. The computer 200 further includes a storage device 220 for storing an operating system 225, application/program 230, and data.

The storage device 220 is connected to the CPU 250 through a storage controller (not shown) connected to the bus 235. The storage device 220 and its associated computer-readable media provide non-volatile storage for the computer 200. Although the description of computer-readable media contained herein refers to a storage device, such as a hard disk or CD-ROM drive, it should be appreciated by those skilled in the art that computer-readable media can be any available media that can be accessed by the computer 200.

By way of example, and not to be limiting, computer-readable media may comprise computer storage media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the computer 200 may operate in a networked environment using logical connections to remote computers through a network 240, such as TCP/IP network such as the Internet or an intranet. The computer 200 may connect to the network 240 through a network interface unit 245 connected to the bus 235. It should be appreciated that the network interface unit 245 may also be utilized to connect to other types of networks and remote computer systems.

The computer 200 may also include an input/output controller 255 for receiving and processing input from a number of input/output devices 260, including a keyboard, a mouse, a touchscreen, a camera, a microphone, a controller, a joystick, or other type of input device. Similarly, the input/output controller 255 may provide output to a display screen, a printer, a speaker, or other type of output device. The computer 200 can connect to the input/output device 260 via a wired connection including, but not limited to, fiber optic, Ethernet, or copper wire or wireless means including, but not limited to, Wi-Fi, Bluetooth, Near-Field Communication (NFC), infrared, or other suitable wired or wireless connections.

As mentioned briefly above, a number of program modules and data files may be stored in the storage device 220 and/or RAM 210 of the computer 200, including an operating system 225 suitable for controlling the operation of a networked computer. The storage device 220 and RAM 210 may also store one or more applications/programs 230. In particular, the storage device 220 and RAM 210 may store an application/program 230 for providing a variety of functionalities to a user. For instance, the application/program 230 may comprise many types of programs such as a word processing application, a spreadsheet application, a desktop publishing application, a database application, a gaming application, internet browsing application, electronic mail application, messaging application, and the like. According to an embodiment of the present invention, the application/program 230 comprises a multiple functionality software application for providing word processing functionality, slide presentation functionality, spreadsheet functionality, database functionality and the like.

The computer 200 in some embodiments can include a variety of sensors 265 for monitoring the environment surrounding and the environment internal to the computer 200. These sensors 265 can include a Global Positioning System (GPS) sensor, a photosensitive sensor, a gyroscope, a magnetometer, thermometer, a proximity sensor, an accelerometer, a microphone, biometric sensor, barometer, humidity sensor, radiation sensor, or any other suitable sensor.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the present invention and practice the claimed methods. The following working examples therefore are not to be construed as limiting in any way the remainder of the disclosure.

In some embodiments, the disclosed technology is directed to a device or cuvette platform for photoacoustic detection within a single glass cuvette.

In some embodiments, the cuvette platform enables the mounting of a cuvette onto a post using an M6-screw for use as a platform for acoustic and optical detection (e.g. photoacoustic, schlieren optics) within a cuvette. In some embodiments, the cuvette platform comprises a semi-circle port, located toward the distal end from the mounting hole, and provides a method of alignment for 6 mm diameter transducers. In some embodiments, the cuvette platform design utilizes short walls for use in combination with transducers and objectives of varying sizes.

The disclosures of each and every patent, patent application, and publication cited herein are hereby each incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A cuvette platform, comprising:

a body having a base and at least one cuvette mounting surface positioned above and parallel to the base and comprising at least one of side retainers and corner retainers configured to retain a cuvette;

at least one peripheral mounting surface extending upward from a first edge of the base forming a right angle with the base and configured to mount at least one peripheral;

at least one flange extending outward laterally from a second edge of the base and comprising at least one mounting feature;

wherein the cuvette platform has a width ranging between about 10 mm and about 100 mm, a length ranging between about 50 mm and about 150 mm, and a height ranging between about 50 mm and about 150 mm, wherein the cuvette mounting surface has an area ranging between about 120 $mm^2$ and about 220 $mm^2$, wherein the body, the at least one peripheral mounting surface, and the at least one flange are formed as a single unit, and wherein the at least one of side retainers and corner retainers are positioned between the at least one peripheral mounting surface and the at least one flange.

2. The cuvette platform of claim 1, wherein the at least one mounting feature comprises at least one of a hole, a tab, a slot, a pin, and a clip.

3. The cuvette platform of claim 2, wherein the at least one mounting feature comprises a hole passing through the flange configured to receive a bolt.

4. The cuvette platform of claim 3, wherein the bolt is an M6 bolt and the cuvette platform is fixedly attached to a threaded hole with the bolt.

5. The cuvette platform of claim 1, further comprising at least one mounting post extending outward from the body perpendicular to the at least one cuvette mounting surface.

6. The cuvette platform of claim 5, wherein the at least one mounting post comprises the at least one peripheral mounting surface.

7. The cuvette platform of claim 6, wherein the peripheral mounting surface is configured to mount at least one of a transducer, an objective, and a light source.

8. The cuvette platform of claim 7, wherein the transducer has a diameter ranging between 1 mm and 15 mm, and the objective has a diameter ranging between 1 mm and 15 mm.

9. The cuvette platform of claim 7, wherein the peripheral mounting surface is formed by a semi-circle cutout region in the mounting post, and is configured to mount a 6 mm transducer.

10. The cuvette platform of claim 1, wherein the side retainers and corner retainers comprise at least one of a ridge, an edge, a rib, a detent, a clip.

11. The cuvette platform of claim 1, wherein the cuvette platform is formed of at least one of Polylactic Acid (PLA), Polytetrafluoroethylene (PTFE), Polyethylene Terephthalate Glycol (PETG), Polyethylene Terephthalate (PET), Polypropylene (PP), Polyether Ether Ketone (PEEK), Acrylonitrile Butadiene Styrene (ABS), aluminum, stainless steel, and titanium.

12. A system comprising:

a cuvette platform, comprising:

a body having a base and at least one cuvette mounting surface positioned above and parallel to the base and comprising at least one of side retainers and corner retainers configured to retain a cuvette;

at least one peripheral mounting surface extending upward from a first edge of the base and forming a right angle with the base and configured to mount at least one peripheral;

at least one flange extending outward laterally from a second edge of the base and comprising at least one mounting feature;

wherein the cuvette platform has a width ranging between about 10 mm and about 100 mm, a length ranging between about 50 mm and about 150 mm, and a height ranging between about 50 mm and about 150 mm, wherein the cuvette mounting surface has an area ranging between about 120 $mm^2$ and about 220 $mm^2$, wherein the body, the at least one peripheral mounting surface, and the at least one flange are formed as a single unit, and wherein the at least one of side retainers and corner retainers are positioned between the at least one peripheral mounting surface and the at least one flange;

a cuvette positioned on the cuvette mounting surface;

at least one transducer positioned on the peripheral mounting surface; and an objective with light source directed towards the cuvette.

13. The system of claim 12, wherein the transducer is configured to read at least one signal from a cuvette mounted on the cuvette mounting surface.

14. The system of claim 13, wherein the objective is configured to provide light to the cuvette.

15. The system of claim 12, wherein the transducer is configured to capture at least one signal from the cuvette.

16. The system of claim 12, wherein the transducer is configured to generate acoustic waves.

17. The system of claim 12, wherein the at least one transducer comprises a first transducer directed towards the cuvette configured to capture at least one signal from the cuvette, and a second transducer directed towards the cuvette configured to generate acoustic waves.

18. A system comprising:

a cuvette platform, comprising:

a body having a base and at least one cuvette mounting surface positioned above and parallel to the base and comprising at least one of side retainers and corner retainers configured to retain a cuvette;

at least one peripheral mounting surface extending upward from a first edge of the base and forming a right angle with the base and configured to mount at least one peripheral;

at least one flange extending outward laterally from a second edge of the base and comprising at least one mounting feature;

wherein the cuvette platform has a width ranging between about 10 mm and about 100 mm, a length ranging between about 50 mm and about 150 mm, and a height ranging between about 50 mm and about 150 mm, wherein the cuvette mounting surface has an area ranging between about 120 $mm^2$ and about 220 $mm^2$, wherein the body, the at least one peripheral mounting surface, and the at least one flange are formed as a single unit, and wherein the at least one of side retainers and corner retainers are positioned between the at least one peripheral mounting surface and the at least one flange;

a computing device communicatively connected to a transducer, a light source, and an objective, comprising a processor and a non-transitory computer-readable medium with instructions stored thereon, which when executed by a processor, performs the steps comprising:

illuminating a cuvette with the objective; and capturing signals from the cuvette with the transducer.

19. A photoacoustic measurement method, comprising the steps of:

providing a cuvette platform, comprising:

a body having a base and at least one cuvette mounting surface positioned above and parallel to the base and comprising at least one of side retainers and corner retainers configured to retain a cuvette;

at least one peripheral mounting surface extending upward from a first edge of the base and forming a right angle with the base and configured to mount at least one peripheral;

at least one flange extending outward laterally from a second edge of the base and comprising at least one mounting feature;

wherein the cuvette platform has a width ranging between about 10 mm and about 100 mm, a length ranging between about 50 mm and about 150 mm, and a height ranging between about 50 mm and about 150 mm, wherein the cuvette mounting surface has an area ranging between about 120 $mm^2$ and about 220 $mm^2$, wherein the body, the at least one peripheral mounting surface, and the at least one flange are formed as a single unit, and wherein the at least one of side retainers and corner retainers are positioned between the at least one peripheral mounting surface and the at least one flange;

affixing the cuvette platform to a surface;

mounting a cuvette on the cuvette platform;

positioning an objective to illuminate the cuvette; and mounting a transducer on the peripheral mounting surface configured to read a signal from the cuvette.

20. A photoacoustic measurement method, comprising the steps of:

providing a cuvette platform comprising:

a body having a base and at least one cuvette mounting surface positioned above and parallel to the base and comprising at least one of side retainers and corner retainers configured to retain a cuvette;

at least one peripheral mounting surface extending upward from a first edge of the base and forming a right angle with the base and configured to mount at least one peripheral;

at least one flange extending outward laterally from a second edge of the base and comprising at least one mounting feature;

wherein the cuvette platform has a width ranging between about 10 mm and about 100 mm, a length ranging between about 50 mm and about 150 mm, and a height ranging between about 50 mm and about 150 mm, wherein the cuvette mounting surface has an area ranging between about 120 $mm^2$ and about 220 $mm^2$, wherein the body, the at least one peripheral mounting surface, and the at least one flange are formed as a single unit, and wherein the at least one of side retainers and corner retainers are positioned between the at least one peripheral mounting surface and the at least one flange;

affixing the cuvette platform to a surface;

mounting a cuvette on the cuvette mounting surface;

illuminating the cuvette with an objective; and capturing signals from the cuvette with a transducer.

* * * * *